United States Patent [19]
Batley, Jr.

[11] 3,775,133
[45] Nov. 27, 1973

[54] FRACTIONATION OF ALFALFA WETTED WITH MOLASSES SERUM

[76] Inventor: William R. Batley, Jr., P.O. Box 216, Brawley, Calif. 92227

[22] Filed: Aug. 2, 1971

[21] Appl. No.: 167,901

[52] U.S. Cl.............. 426/378, 260/112, 426/489, 426/454
[51] Int. Cl............................................ A23k 1/02
[58] Field of Search .................. 99/6, 17, 8, 14, 99/199, 204; 260/112

[56] References Cited
UNITED STATES PATENTS

| | | | |
|---|---|---|---|
| 3,551,163 | 12/1970 | Vincent | 99/6 |
| 1,996,395 | 4/1935 | Arnold | 99/6 |
| 2,552,343 | 5/1951 | Peebles | 99/8 |
| 3,637,396 | 1/1971 | Hollo | 260/112 |
| 3,684,520 | 8/1972 | Bickoff | 99/8 |
| 1,201,663 | 10/1916 | Werner | 99/8 |
| 1,816,998 | 8/1931 | Cushman | 99/8 |
| 2,021,996 | 11/1935 | Hanglein | 99/8 |
| 2,504,159 | 4/1950 | Singer | 99/8 |
| 2,940,857 | 6/1960 | Andrews | 99/8 |

OTHER PUBLICATIONS

J. Agr. Food Chem., Vol. 18, No. 6, P1086–1089, 1970 - Knuckles.
Isolation of Leaf Components–Chayen J. Sci. Food Agric., 1961, PS02–512.

Primary Examiner—Norman Yudkoff
Assistant Examiner—Hiram H. Bernstein
Attorney—Lyon & Lyon

[57] ABSTRACT

A process for fractionating leafy green crops is disclosed. This process involves the separation of at least one valuable constitutent from the crop and preferably comprises the production of a dehydrated green crop together with one or more valuable by-products. The process includes a pressing or squeezing of the green crop which has been mixed with molasses serum which is a by-product of the operation. The pressed crop may then be dehydrated by normal methods. The rolled juice which is expelled from the wetted squeezed crop is then treated to coagulate a valuable protein therefrom and the remaining liquid is a molasses serum which is recycled to the green crop prior to the pressing step. That portion of the molasses serum which is not required for mixing with the green crop may be added to the pressed cake. Specific process steps regarding the process as applied to alfalfa are also disclosed.

12 Claims, 1 Drawing Figure

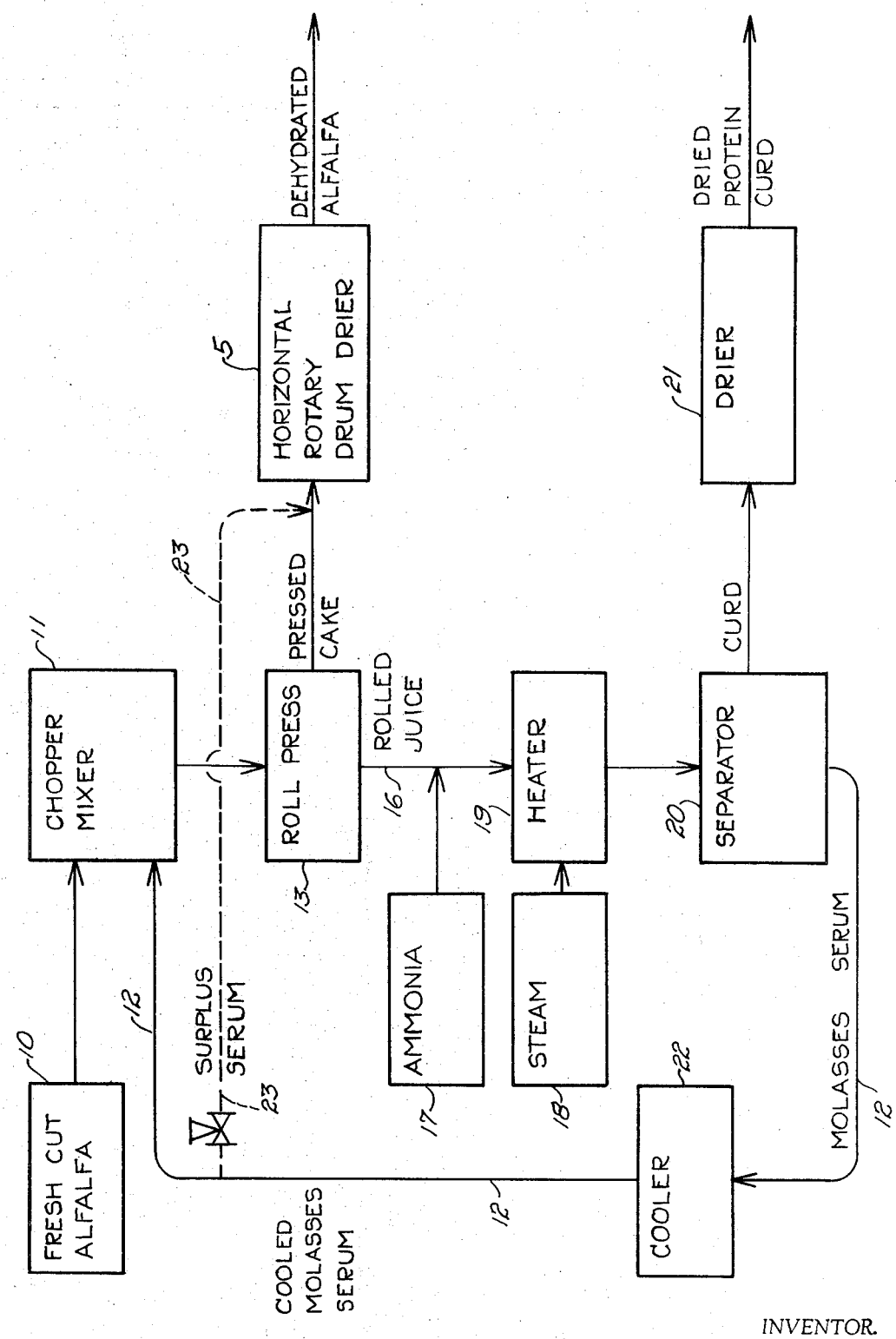

FRACTIONATION OF ALFALFA WETTED WITH MOLASSES SERUM

BACKGROUND OF THE INVENTION

The field of the invention is the processing of green crops for use in animal, poultry or human feed. The dehydration of green crops such as alfalfa has been carried out for many years and typically utilize the steps of choping the crop into relatively small pieces, passing it through a dehydrator such as a rotating gas-fired horizontal drum dryer to produce a dehydrated product. This process has become particularly refined for use with alfalfa and the quality of the resulting dehydrated alfalfa (herein "dehy") has been substantially improved by such steps as storing the product in a non-oxidizing atmosphere, the addition of chemical antioxidants, pelletizing, cubing, and air-classifying. These improvements have helped reduce processing costs as well as increase the quality of the resulting dehy.

In spite of the many improvements which have been introduced, there are several significant factors which have limited the use of dehy. First, the use of dehy in poultry feed has been limited by the relatively high fiber content of normal dehy. Secondly, the capacity of the commonly used rotary dryer is limited by the relatively high moisture content of the chopped green alfalfa thereby adversely affecting the cost of the dehydrating process. It has recently been discovered that a protein concentrate can be produced by the coagulation of juice which has been squeezed from fresh green crops. This pressing step further increased the production of the dryer in that it reduces the amount of moisture which must be driven from the crop. Because of the relatively fiberous nature of green crops and the high production volumes, most means of squeezing have not proved economically justified. It has been found however that the use of sugar cane rolls can remove some juice from green crops and a process utilizing such equipment is disclosed in the following articles: Alfalfa Products By Wet Fractionation by R.R. Spencer et al, Transactions of the ASAE, Vol. 13, No. 2, pp. 198–200, 1970; PRO-XAN Process: Incorporation and Evaluation of Sugar Cane Rolls in Wet Fractionation of Alfalfa, B.E. Knuckles et al, J. Agr. Food Chem. Vol. 18, No. 6, pp. 1086-89; and Big Squeeze: Getting The Most Out Of Alfalfa, Agr. Research, U.S.-D.A., September 1969 pp. 6–7 and these articles are incorporated by reference herein to illuminate the background of the present invention.

Briefly, the wet fractionation of green crops includes the steps of passing the green crop through sugar cane rolls to produce a relatively dry pressed cake and a liquid referred to as "rolled juice." The pressed cake is dried in the normal manner to provide a dehydrated feed which, in the case of alfalfa, is a widely used commercial product. The rolled juice is coagulated by means such as heating which results in a curd and a liquid referred to as "molasses serum." The curd is dried to form a fiber-free protein concentrate which has been found to be a valuable poultry feed additive and is further of great interest as a food for humans. The product is a free-flowing, fiber-free powder or granule.

This process, although widely practiced on a pilot plant scale by the United States Department of Agriculture has been found difficult to carry out on the full scale commercial basis. This difficulty results from an inability to remove a sufficient amount of protein from the green crop during the sqeezing operation so that the increased value of the protein does justify the cost of the equipment required to recover it. When the sugar cane rolls are adjusted to increase the amount of liquid expelled, the rolls must be so close together that the green crop will not pass through them but instead will build up on the upstream edge of the nip of the rolls. Conversely, when the sugar cane rolls are opened enough to provide the desired output of pressed cake, the pressure is not sufficient to expel an economically useful amount of rolled juice. Thus, in practice, it was found that the desired process described above and in the articles incorporated by reference herein was not practical on a large scale commercial basis.

SUMMARY OF THE INVENTION

It has been discovered that the output of dried protein from the wet fractionation of leafy green crops may be greatly increased by feeding a stream of molasses serum to the green crops prior to the squeezing operation. The molasses serum is the liquid by-product recovered when the dried protein curd has been removed from the rolled juice produced by the squeezing operation. Thus, in effect, a closed loop is provided whereby a molasses serum is circulated into the green crop prior to squeezing, is held for a short time in intimate contact with the crop thereby dissolving protein from the crop, is next squeezed and removed from the crop together with its dissolved protein, is passed through a coagulation step wherein the protein is separated and then is returned to the cycle to be again mixed with the leafy green crop. The commercial practice of this process has been found to increase dried protein yield over 300 percent. Any excess of molasses serum which is developed over that needed for the dissolving cycle may be added to the pressed cake prior to or during the drying thereof.

BRIEF DESCRIPTION OF THE DRAWINGS

The drawing shows a flow sheet of the process of the present invention as applied to alfalfa.

DESCRIPTION OF THE PREFERRED EMBODIMENTS

By way of example, the process of the present invention will be described with reference to the leafy green crop alfalfa. It is to be understood, however, that the process may be applied to other crops with the modifications in operating conditions dictated by differences in the particular crop. Referring to the drawings, fresh cut alfalfa 10 is fed to a conventional chopper which serves to cut up the alfalfa into a desired size and produces what is commonly called "green chop." A stream of cold (below 100° F) molasses serum 12 is added to chopper 11 which thereby serves both a chopping and mixing function. This "green chop" and serum mixture is next fed to a roll press 13 which comprises a commercially available sugar cane roll press. This utilizes three rolls which is driven by an electric motor through a reduction gear. The press should be operated with a roll spacing such that the alfalfa will not be held upstream of the nip of the rolls. As long as the delay has the required amount of protein, the nip should be adjusted as small as possible to maximize the amount of rolled juice produced. The pressed cake from the roll press is fed through a conventional dryer 15 to produce dehydrated alfalfa with a protein content of 17 percent or greater.

The rolled juice 16 is pumped from roll press 13 and its pH is adjusted to between 8 and 9 by feeding a stream of ammonia 17 into the juice. A preferable pH is 8-½. The juice is next heated by the injection of steam 18 in a heater 19 to increase its temperature to 180° F.

The heated rolled juice is next fed to a separator 20 where the protein curd is permitted to rise to the top and the molasses serum is drawn from the bottom. By feeding an inert gas such as nitrogen into the separator, this separation may be improved. Also, by permitting a long period of standing, the curd will settle and may be separated by any means such as filtration or centrifugation. The curd is next passed to a drum type dryer 21. Other means of drying such as spray drying may also be used. This dryer produces the dried protein curd which has found wide acceptance as a high energy feed additive.

The molasses serum which still contains some ammonia, is next cooled in cooler 22 which may be an evaporative cooler. It is preferable that the serum be cooled to below about 100° F so that no protein will be coagulated in the chopper-mixer 11 or in the roll press 13. Any molasses serum which is not required to sufficiently wet the alfalfa is preferably passed through line 23 and combined with the pressed cake from roll press 13. It is standard practice to feed some water to a gas-fired rotary alfalfa dryer when the dryer begins to produce an excess of smoke. This smoke is believed caused by the burning of a portion of the crop and the addition of water tends to reduce the burning. The serum not only performs this function but also provides additional feed value and solids content to the resulting dehy in that the serum contains dissolved sugar and other beneficial ingredients. Alternatively, this excess serum may be collected and sold in its liquid form since it is a source of soluble vitamins and UGF (unidentified growth factors) useful in poultry feed.

The providing of a closed loop of molasses serum causes a surprising and substantial effect on the fractionating process. The following comparison shows a typical material balance with and without the closed loop serum stream. The input in both instances is 45 tons per hour of green chop which is continued for 24 hours a day. This input produced the following over a 24 hour period:

| WITHOUT RECYCLE | WITH RECYCLE |
|---|---|
| Dehy = 223 tons | Dehy = 216 tons |
| Dried Protein Curd = 3 tons | Dried Protein Curd = 10 tons An economic comparison at present day values (dehy $50 per ton and dried protein curd $140 per ton) is as follows: |
| WITHOUT RECYCLE | WITH RECYCLE |
| Dehy value = $11,150 | Dehy value = $10,800 |
| Dried protein curd value = 420 | Dried protein curd value = 1,400 |
| TOTAL $11,570 | TOTAL $12,200 |

Thus, a daily increase in value of produce produced of $630 is realized by the practice of the present invention for this actual production level.

In the specific instance of dehydrated alfalfa it is important that the protein content of the final product be held above that required to produce a specification product. A common guaranteed protein level is 17 percent. While a higher protein content could be obtained by the straight dehydration of alfalfa, this higher protein content is not necessarily beneficial. There is a growing need for long fiber roughage in dense form for dairy and beef cattle. Protein content is becoming of less importance in cattle feed because of the use of low cost urea and other non-protein nitrogen (NPN) products in place of protein. Thus, the practice of the present invention does not detract from the market value of the resulting dehy. It has furthermore been found that the removal of juice from the alfalfa prior to the pressed cake dryer permits a lower retention time of the pressed cake in the dryer which in turn leads to reduced burning losses in the dryer.

An earlier attempt was made to increase protein yield by adding water to the chopper-mixer much the same way that the molasses serum is added. It was found however that the water only slightly increased the protein yield and did not approach the increase found by the addition of molasses serum. The amount of molasses serum which is surplus has been found to be a relatively small amount and often no sur-plus at all results. The feeding of this surplus serum to the dryer eliminates a disposal problem as well as increasing the amount of solids from the dryer.

Other examples of green crops useful with the present invention include grasses, clover, and leafy green vegetables such as lettuce, pea or bean vines, celery or beet tops, barley, and sorghum. The amount of molasses serum which is recycled is such that the green chop is completely wetted by the serum. An excess of serum is not detrimental in that it merely is expelled with the rolled juice and thus does not substantially add to the process and cost. It is necessary that the serum be added to the green chop prior to the pressing or squeezing step so that it will be forced into the cells of the alfalfa as it is squeezed and thus be capable of dissolving a significant amount of protein from the alfalfa. The effect is thus both a physical washing off and also a sponge effect where the serum enters the cells of the alfalfa and is squeezed out by the sugar rolls.

Another area of recent interest is the use of alfalfa as a source of food for humans. It has long been known that alfalfa produces more protein per acre than any other cultivated crop but due to its higher fiber content has not been believed to be adaptable for human food. The dried protein curd does not have this shortcoming and can be utilized by humans since it does not contain any fibers. The dried protein curd is also high in xanthophyll which makes it particularly useful as a pigmentation supplement for poultry feed.

The present embodiments of this invention are to be considered in all respects as illustrative and not restrictive, the scope of the invention being indicated by the appended claims rather than by the foregoing description, and all changes which come within the meaning and range of equivalence of the claims therefore are intended to be embraced therein.

What is claimed is:

1. A process for dehydrating green leafy plants comprising:
   mixing said plants with a recycle molasses serum to produce a wetted plant feed;
   passing said wetted plant feed through a press to expel a portion of the juice from said feed, thereby producing a pressed cake and a rolled juice stream;
   coagulating said rolled juice stream to form a curd;
   separating said curd from the uncoagulated portion of said rolled juice thereby producing a protein curd portion and a molasses serum portion which provides the source of said recycle molasses serum, and passing said pressed cake through dehydrating means to drive off moisture therefrom.

2. The process of claim 1 wherein any excess portion of said recycle molasses serum is added to said pressed cake.

3. The process of claim 1 wherein said coagulating step is carried out by heating said rolled juice to a temperature at which a protein curd is formed therein.

4. The process of claim 3 wherein said recycle molasses serum is cooled to a temperature at which no protein contained in said crop is coagulated before said serum is mixed with said plants.

5. A process for dehydrating freshly cut alfalfa comprising:

mixing said alfalfa with a recycle molasses serum which has been cooled to below about 100° F to produce a wetted alfalfa feed;

passing said wetted alfalfa feed through a press to expel a portion of the juice from said feed thereby producing a pressed alfalfa cake and a rolled juice steam;

heating said rolled juice stream to about 130° F to coagulate a portion of said rolled juice into a curd;

separating said curd from said rolled juice to provide a wet protein curd and a molasses serum which serves as a source of said recycle molasses serum; and passing said pressed alfalfa cake through dehydrating means to drive off moisture and produce dehydrated alfalfa.

6. The process of claim 5 wherein ammonia is added to said rolled juice stream to adjust its pH to between about 8 and 9.

7. The process of claim 5 wherein said press is a three roll press.

8. The process of claim 5 wherein a portion of said recycle molasses serum is combined with said pressed cake.

9. In a wet fractionation process for the dehydration of alfalfa of the type comprising a pressing of the fresh alfalfa to expel liquid therefrom prior to the dehydration of the resulting pressed cake and further wherein the roller juice resulting from the pressing step is coagulated to form a protein curd and a molasses serum, the improvement which comprises:

mixing at least a portion of said separated molasses serum with said alfalfa prior to the pressing thereof, the amount of said serum being sufficient to completely wet the alfalfa.

10. The process of claim 9 including the further improvement of adding ammonia to said rolled juice.

11. The process of claim 9 including the further improvement of cooling said molasses serum to below about 100° F.

12. The process of claim 9 wherein any excess molasses serum is added to said pressed cake before it is completely dehydrated.

* * * * *